Figure 1:
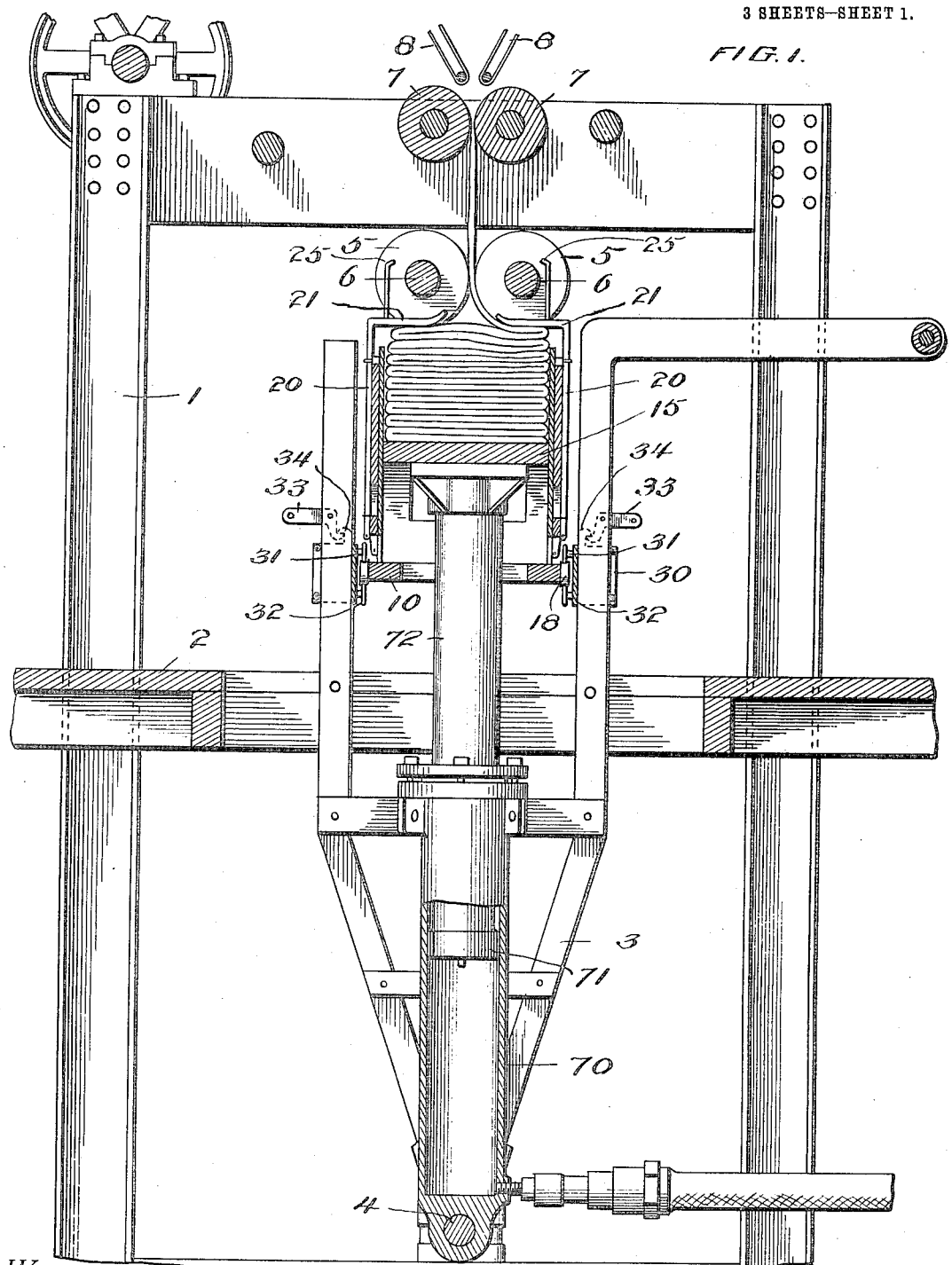

J. N. WOOD.
BALING APPARATUS.
APPLICATION FILED APR. 25, 1910.

971,951.

Patented Oct. 4, 1910.
3 SHEETS—SHEET 1.

WITNESSES:

INVENTOR
James N. Wood
BY
A. Whitaker Prevost, Attorneys

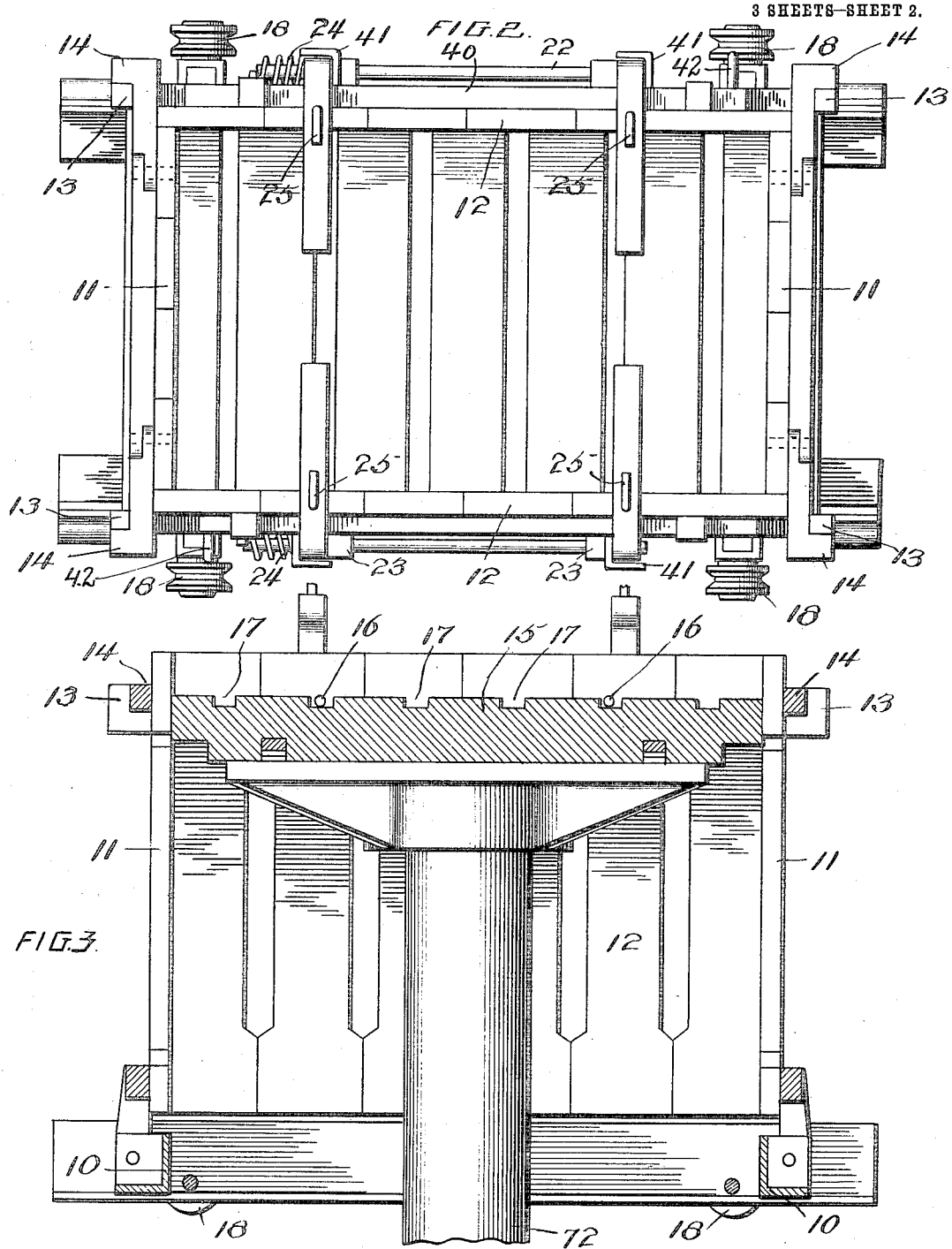

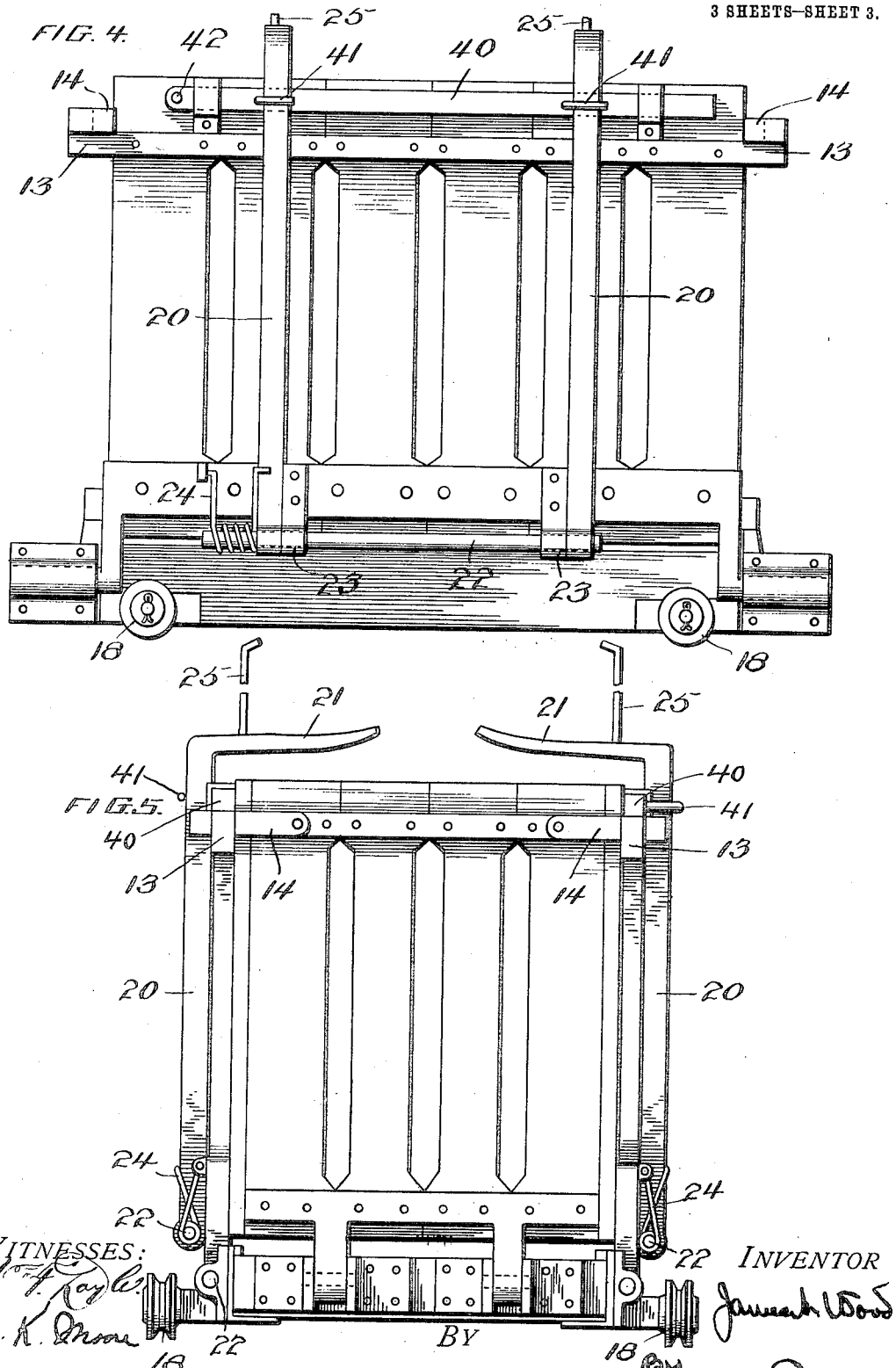

UNITED STATES PATENT OFFICE.

JAMES N. WOOD, OF RICHMOND, VIRGINIA, ASSIGNOR TO NEELY COMPRESS AND COTTON COMPANY, INC., OF RICHMOND, VIRGINIA.

BALING APPARATUS.

971,951.  Specification of Letters Patent.  Patented Oct. 4, 1910.

Application filed April 25, 1910. Serial No. 557,516.

*To all whom it may concern:*

Be it known that I, JAMES N. WOOD, a citizen of the United States, residing at Richmond, in the count of Henrico and State of Virginia, have invented certain new and useful Improvements in Baling Apparatus; and I do hereby declare the following to be a full, clear, and exact description of the invention, such as will enable others skilled in the art to which it appertains to make and use the same.

My invention is an improvement in baling presses for cotton and other materials in which the bale box is moved laterally either by reciprocation or by oscillation beneath bale forming devices, which fold a continuous bat into laminations of folds and compress them successively thereby forming a bale. In this type of press considerable difficulty has been experienced in removing the bale from the receptacle which contains it, without losing the compression thereof.

The object of my present invention is to provide a removable bale box for the movable baling frame, which is so constructed as to retain the bale in compressed condition while the box is removed from the press, and until the bale can be covered and secured by the usual bale bands.

In the accompanying drawings I have selected for purposes of illustration a baling press having an oscillating baling frame for receiving a knock down bale box having my invention embodied therein, but it is to be understood that the said invention is applicable to other forms of press and to other forms of bale box than those herein specifically shown and described.

In the said drawings, Figure 1 represents a vertical sectional view of a baling press embodying my invention. Fig. 2 is a top plan view of the bale box removed. Fig. 3 is a longitudinal vertical sectional view of the same. Fig. 4 is a side elevation of the bale box, and Fig. 5 is an end elevation of the same.

Fig. 1 represents a sectional view of a baling press in which 1 indicates the main frame, 2 the baling floor, and 3 the oscillating baling frame, mounted upon suitable pivotal connections 4 and extending vertically through an aperture in the baling floor. The bale forming devices form no part of my present invention and will not be described in detail—they are here indicated as a pair of baling rollers 5, 5, mounted upon suitable shafts 6, 6 the material to be baled being fed to the baling rollers by suitable feed rolls 7, 7 to which it is delivered by oppositely inclined carrying belts or conveyers 8, 8 or other means. The mechanism for driving the baling rollers and feed rollers, and for effecting the oscillation of the baling frame may be of any desired construction, for example such as is illustrated in my former application for Letters Patent of the United States No. 538,285 filed Jan. 15, 1910, and as its specific structure forms no part of my present invention, it will not be specifically described herein.

The bale box is shown in detail in Figs. 2 to 5 inclusive and comprises in this instance a bottom frame 10, to which are hinged the two end walls 11, 11 and the two side walls 12, 12, the side and end walls being provided with suitable means for securing them together, when the box is in operative condition. In this instance I have shown the sides 12, 12 provided with horizontally disposed hooks 13, 13 projecting beyond their ends, and engaged by pivoted hooks 14, 14 secured to the end walls 11, but the side and end walls may be secured together by other means.

15 represents the bottom of the box which is movable vertically therein, and the side walls are preferably provided on their inner faces and near their upper edges with projections 16, 16 to engage the bottom 15 and limit its upward movement in the box. The upper face of the bottom 15 is also provided with suitable grooves 17 for facilitating the insertion of the bale bands. The bottom frame 10 is also provided with grooved supporting wheels or rollers 18, 18 as shown.

Each of the sides 12, 12 is provided with one or more (two being shown) retaining devices, each comprising a metallic bar having a vertical portion 20 pivoted at its lower end, to the side wall, and provided at its upper end with a horizontally disposed retaining arm 21 extending inward over the box and nearly to the center of the same. In this instance I have shown the two arms 20, 20 rigidly secured to a horizontal rock shaft 22 mounted in bearings 23 secured to each side wall 12, and a single spring 24 is secured to the said retaining devices, to normally hold them in place, with their horizontal portions above the box, and their vertical portions in engagement with the side walls. I may obviously employ a separate spring for each of said retaining devices if preferred. Each of the said retaining devices is provided with an upwardly extending arm 25, which is constructed to engage with a stationary part of the press (in this instance with one of the shafts 6 of the baling rollers) as the baling frame is oscillated, thus permitting the box to swing away from beneath first one set of retaining devices and then the other to permit the bat to be folded and compressed upon the bale, as it is being formed upon the movable bottom 15, the springs 24 returning said devices to normal position each time the bale box and frame returns to its median or vertical position.

In order to secure the bale box in position in the baling frame, the said frame is provided with vertically movable slides 30 engaging the upright corner posts of the baling frame and carrying horizontal upper and lower track rails 31, 32 between which the wheels or rollers 18, 18 of the box may pass. When the slides 30 are in their lowest positions the track rails are substantially on a level with the baling floor to facilitate the insertion and removal of the box, and the slides are adapted to be secured in raised or operative position by means of pivoted catches 33 which engage hook shaped projections 34 on said slides.

The oscillating frame 3 is provided with the usual pressure cylinder 70 and piston 71 carrying a plunger 72 the upper end of which is adapted to engage the movable bottom of the bale box and raise it until it engages the pins or projections 16 (see Fig. 3) when the entire box will be raised, with the slides 30, and track rails, until the hooks 34 engage the catches 33 and lock the box and slides in their uppermost positions. The press may now be started and the material fed in and compressed by the baling devices until the bale is formed.

To remove the bale it is only necessary to release the catches 33 and let the slides 30 fall when the bale box can be drawn out upon the baling floor. The retaining devices before described will hold the bale under compression until the bale bands and covering material are applied in the usual manner.

In order to prevent the accidental displacement of the retaining devices after the bale is formed, I prefer to provide a locking mechanism therefor. This consists in the present instance of a horizontal locking bar 40 mounted to slide on the exterior face of each of the side walls near the top edge of the same, and provided with locking hooks 41 to engage the vertical portions of the retaining devices and lock them in position. The locking bar 40 may be provided with a stud or handle 42, by which it can be readily moved into and out of operative position.

What I claim and desire to secure by Letters Patent is:—

1. The combination with a bale box, of retaining devices pivoted thereto, and having portions extending horizontally above the box, and arresting arms adapted to engage stationary portions of the press to limit the movement of said retaining devices, and springs engaging said retaining devices and holding them normally in operative relation with the box.

2. The combination with bale forming devices, of a bale box, means for moving it laterally with respect to the bale forming devices, retaining devices pivoted to the bale box, and having portions extending horizontally above the same, means for alternately arresting the said retaining devices on opposite sides of the box, and means for maintaining said retaining devices in operative position when the bale box is in its median position.

3. The combination with the bale forming devices, of a laterally movable bale box, retaining devices pivotally connected therewith, and having portions extending horizontally above the bale box, springs normally tending to hold said retaining devices in operative position, and parts connected with said retaining devices for engaging stationary portions of the press, when the bale box passes its median position.

4. The combination with a bale box, of retaining devices pivoted thereto, and having portions extending horizontally above the box, and arresting arms adapted to engage stationary portions of the press to limit the movement of said retaining devices, and springs engaging said retaining devices and holding them normally in operative relation with the box and locking mechanism for positively securing said retaining devices in operative position.

5. The combination with bale forming devices, of a bale box, means for moving it laterally with respect to the bale forming devices, retaining devices pivoted to the bale box, and having portions extending horizontally above the same, means for alternately arresting the said retaining devices on opposite sides of the box and means for maintaining said retaining devices in operative position when the bale box is in its median position and locking mechanism for positively securing said retaining devices in operative position.

In testimony whereof I affix my signature, in the presence of two witnesses.

JAMES N. WOOD.

Witnesses:
J. E. DAUGHTREY, Jr.,
E. P. GOODWYN.